H. A. BALLARD.
LAST.
APPLICATION FILED JULY 24, 1909.
1,080,521.
Patented Dec. 2, 1913.
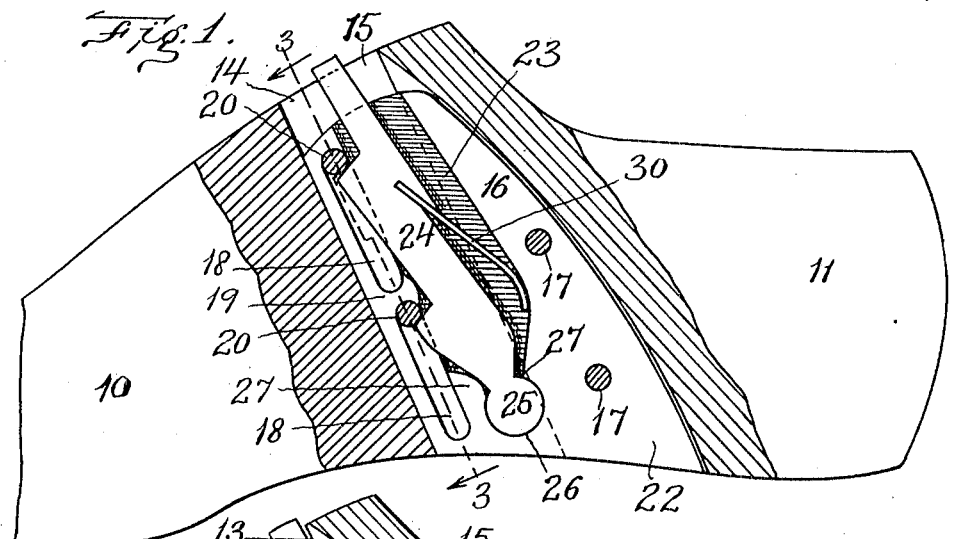
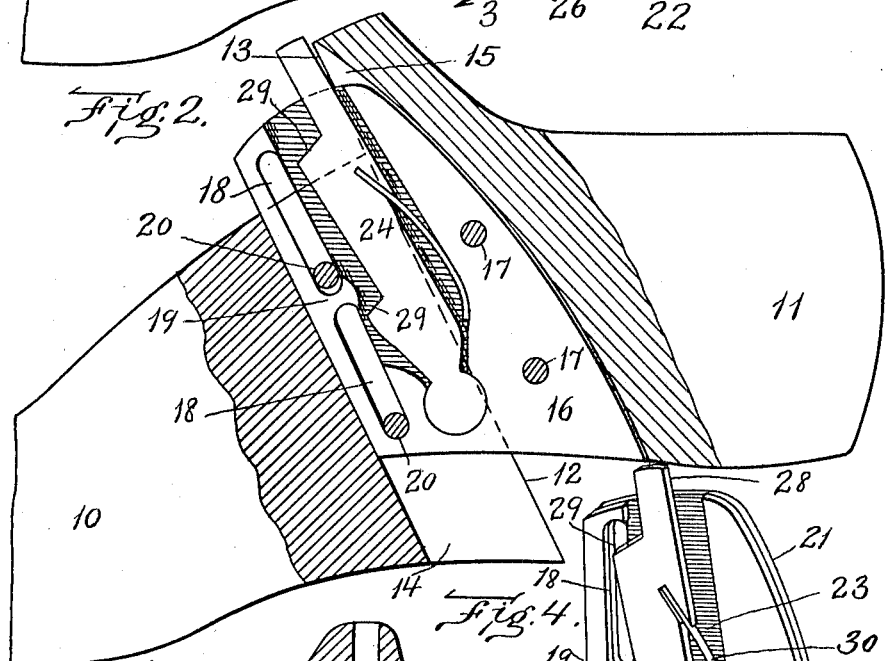
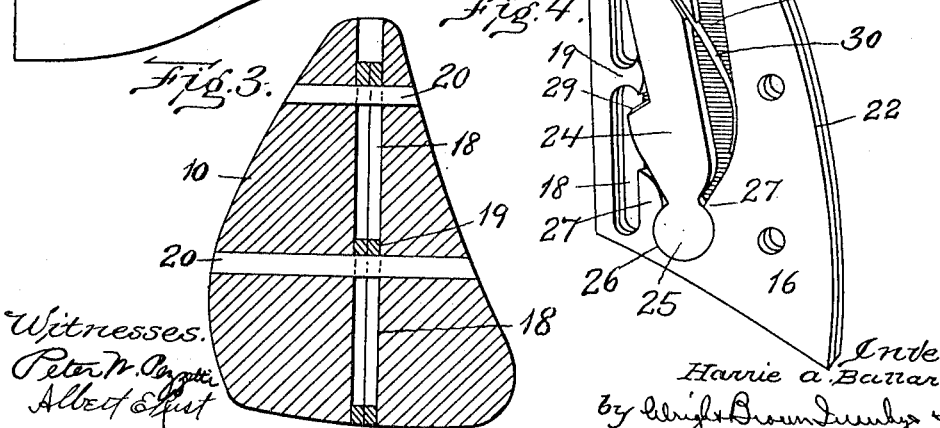

UNITED STATES PATENT OFFICE.

HARRIE A. BALLARD, OF BOSTON, MASSACHUSETTS, ASSIGNOR TO THE BOYLSTON MFG. COMPANY, OF SOUTH BOSTON, MASSACHUSETTS, A CORPORATION OF NEW JERSEY.

LAST.

1,080,521.  Specification of Letters Patent.  Patented Dec. 2, 1913.

Application filed July 24, 1909.  Serial No. 509,288.

*To all whom it may concern:*

Be it known that I, HARRIE A. BALLARD, of Boston, in the county of Suffolk and State of Massachusetts, have invented certain new and useful Improvements in Lasts, of which the following is a specification.

This invention relates to a last comprising a forepart and heel-part adapted to slide with relation to each other so that the last may be shortened and readily removed from a shoe without stretching the same. The forepart and heel-part of a last, formed in this manner, are usually connected by a connecting member, and are provided with means for locking the two parts in their normal position, said means being adapted to be retracted for the purpose of unlocking the two parts to permit relative movement thereof.

The objects of the present invention are to reduce the cost of manufacture of such a last as much as possible, and at the same time to provide a connecting member and locking device having sufficient strength and rigidity to withstand the strains imposed upon the last during the manufacture of a shoe.

The invention is embodied in a connecting member embedded in the forepart and heel-part which are slotted to receive the connecting member and which consists of two or more plates arranged face to face and formed with a recess adapted to contain the locking member. By reason of forming the connecting member of a plurality of plates, the expense of providing a recess for the locking member may be kept at a relatively low point by cutting out a portion of one the plates prior to assembling the plates. In this way, the plate which lies next to the plate which is cut out, constitutes a seat for the locking member. The most convenient and cheapest form of locking member to be used with this form of connection may be formed of sheet metal equal in thickness to the plate so cut out and is therefore adapted to be flush or in other words, to lie in the same plane as the recessed plate.

The most simple manner of applying the connecting member formed in the foregoing manner is to affix it to one of the last parts and to form it with one or more slots adapted to receive transverse pins carried by the other last part whereby sliding relation is completed between the latter part and the connecting member. The locking member carried by the connecting member may be provided with shoulders or otherwise formed so as to engage and coöperate with the sliding pins and lock the sliding part against movement relatively to the connecting member.

Of the accompanying drawings which illustrate one form in which the invention may be embodied, Figure 1 is a side elevation of a two-part last in extended condition, partly broken out and revealing the connecting and locking means. Fig. 2 is a similar view showing the locking member retracted and the two parts in foreshortened condition. Fig. 3 is a section on line 3—3 of Fig. 1. Fig. 4 is a perspective view of the connecting member and locking member.

The same reference characters indicate the same parts wherever they occur.

The last, here shown, comprises a forepart 10 and heel-part 11 formed with abutting faces 12 and 13. The two parts are divided on a plane which extends upwardly and forwardly from the rear of the arch portion whereby sliding movement of one part relatively to the other is adapted to produce a foreshortening effect. The abutting portions of the parts 10 and 11 are provided with longitudinally perpendicular slots 14 and 15 adapted to receive a connecting member 16. The member 16 is affixed to one of the parts by means such as transverse pins 17 and is adapted to slide in the slot of the other part. That portion of the connecting member which has sliding relation, is slotted as indicated at 18. The slotted portion may be formed of a single elongated slot, or, as here shown, of two separate slots arranged in alinement and separated by a bridge 19. In either event it is desirable that the slot or slots should be parallel to the plane of the abutting faces 12 and 13. Connection between the member 16 and the sliding part may be completed by transverse pins 20 carried by said part and extending through the slotted portion of the connecting member. The two distant ends of the slots 18 constitute stops for limiting the sliding movement of the member 16 and the bridge portion 19 may also be arranged to be engaged by the pins 20 and thus act as an additional stop.

The connecting member 16, as illustrated, consists of two plates 21 and 22 of similar outline. The plates are arranged face to face and form, as it were, a member of double thickness. The plate 22, before being assembled, is formed with a recess 23 extending transversely therethrough, said recess being provided for the reception of a locking device 24. One end of the member 24 is formed with a partially circular head 25 and the recess 23 includes a socket 26 for the reception of the head 25. The socket 26 has a contracted throat formed by shoulders 27 which are adapted to confine the head in the socket. The other end of the member 24 may extend beyond the edge of the connecting member 16 in the form of a handle or finger piece 28 by which it may be manually moved. When the end 28 is moved in one direction the member 24 swings about the axis of the head 25 which constitutes a pivot therefor. The end 28, after being moved to unlock the parts of the last, may be drawn upwardly to move the heel part. The member 24 is provided with shoulders 29 which are adapted to engage and lock the pins 20 in the slots 18. A leaf spring 30 may be affixed to the locking member 24 and arranged so as to engage a wall of the recess 23 and exert its tension to move the locking member into locking position as shown by Figs. 1 and 4.

The connecting means for the parts 10 and 11 and the locking device here shown are extremely rigid and effective, and are adapted to be produced at a relatively slight cost of manufacture. The plates 21 and 22 may, if desired, be otherwise connected with each other by means of rivets, not shown, or they may be, instead of being formed of separate plates, formed of a single plate folded to present two laminæ. It is not essential, however, that the laminæ should be connected otherwise than by the pins by which the forepart and heel-part are attached.

The locking member 24 lies within the planes of the faces of the member 16. Its end extends upwardly so as to project a short distance beyond the waist of the last, and, being movable longitudinally of the last to unlock the forepart and heel part, its end is in position where it may be manipulated without the aid of a special tool.

Having thus explained the nature of my said invention and described a way of constructing and using the same, although without attempting to set forth all of the forms in which it may be made or all of the modes of its use, I declare that what I claim is:—

1. A last comprising a heel-part, a forepart, a connecting member affixed to one part and having sliding relation with the other, a plurality of members affixed to the sliding part, and a member carried by said connecting member and provided with a plurality of shoulders to engage said fixed members respectively and lock the parts of the last against movement.

2. A last comprising a heel-part, a forepart, a connecting member affixed to one part and having a slotted portion in sliding relation with the other, a plurality of pins embedded in said other part and extending through said slotted portion, and a locking member pivoted at one end to said connecting member and having shoulders to engage and lock with said pins.

3. A last comprising a heel-part, a forepart, a connecting member affixed to one part and having a slotted portion in sliding relation with the other, a plurality of pins embedded in said other part and extending through said slotted portion, said connecting member having a recess, and a locking member having a pivot arranged in said recess, and shoulders to engage said pins.

4. A last comprising a forepart, a heel-part, a connecting plate affixed to one part and having a slotted portion embedded in sliding relation in the other, a plurality of pins extending through said slotted portion into said sliding part, and a spring-actuated locking member carried by said connecting member and formed with shoulders to engage and lock said pins.

5. A last comprising a forepart, a heel-part, a connecting member affixed to one part and having a slotted portion in sliding relation with the other, means for connecting the slotted portion with the sliding part, said connecting member having a recess with a contracted throat, and a locking member formed with a head movably confined in said recess, and with one or more locking shoulders to engage said connecting means to lock the last.

6. A last comprising a forepart and heel-part formed with longitudinal perpendicular recesses in their abutting portions, a connecting member consisting of a plurality of flat plates arranged face to face in said recesses and affixed to one part and also provided with slots, means carried by the other part and extending through said slots so as to slide therein, one of said plates having a recess, and a locking member arranged in the recess of said plate to coöperate with and lock the sliding means in said slots.

7. A last comprising a forepart, a heel-part, a connecting member consisting of a plurality of plates arranged face to face and formed with a slotted portion, said forepart and heel-part having slots for the reception of said member, means carried by one part and extending with sliding relation through the slotted portion of said member, means affixing said member in the other part, said member having a recess extending through one of said plates, and a locking member arranged in said recess and formed with shoulders to engage and lock said sliding means.

8. A last comprising a forepart and a heel-part capable of relative sliding movement, a member connecting said parts, said member being affixed to one of said parts, and movably connected to the other of said parts, said parts being recessed for the reception of said connecting member, and a movable locking member carried by said connecting member, said locking member having a portion extending above the last whereby it may be manually engaged and operated.

9. A last comprising a forepart and a heel-part capable of relative sliding movement, a member connecting said last parts, said member being affixed to one of said parts and slidably connected to the other of said parts, and a locking member movably mounted on said connecting member, and having a manually engageable portion projecting upwardly beyond the contour of the last in front of the heel-part, so that it is capable of direct manipulation.

In testimony whereof I have affixed my signature, in presence of two witnesses.

HARRIE A. BALLARD.

Witnesses:
W. P. ABELL,
P. W. PEZZETTI.

---

Copies of this patent may be obtained for five cents each, by addressing the "Commissioner of Patents, Washington, D. C."